A. H. Bryant.
Egg Carrier.

No. 3698. Reissued Nov. 2. 1869.

Witnesses
Geo. Wiggins
James Moore

Inventor
Abner H. Bryant

UNITED STATES PATENT OFFICE.

ABNER H. BRYANT, OF PHILADELPHIA, PENNSYLVANIA.

IMPROVEMENT IN EGG-CARRIERS.

Specification forming part of Letters Patent No. 75,623, dated March 17, 1868; Reissue No. 3,698, dated November 2, 1869.

*To all whom it may concern:*

Be it known that I, ABNER H. BRYANT, of Philadelphia, in the State of Pennsylvania, have invented a new and useful Suspension Egg-Carrier; and I do hereby declare that the following is a full, clear, and exact description of the construction and mode of using the same, reference being had to the annexed drawings, making a part of this specification, in which—

Figure 2:
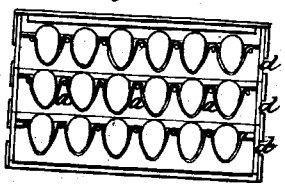
Figure 3:
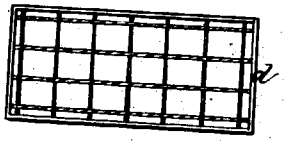
Figure 4:
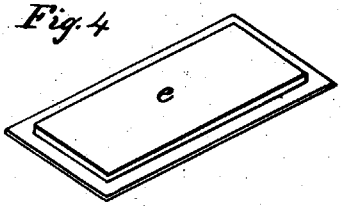
Figure 1:
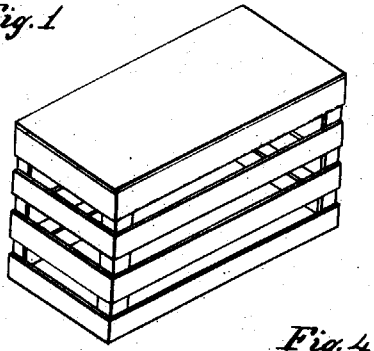

Figure 1 is an isometrical view of the box-frame, with its lid, without the trays. Fig. 2 is a vertical section of the carrier, showing the web of pockets *a a a* for carrying the eggs. Fig. 3 is a plan view of a tray, with its cords woven in squares, forming thereby convenient means for suspending eggs in pockets. Fig. 4 is a view of the lid of the carrier, with an air-cushion for protecting the eggs, and affording means for displacing or removing the same when desirable.

My invention relates to means for transporting eggs with safety; and it consists, mainly, in the construction of a series of compartments or pockets, each adapted for holding a single egg, and arranged in frames or trays in such manner that each egg shall be suspended therein and guarded from collision with all the other eggs, both in the frame and in the box in which a series of such frames is placed.

The letter A of the drawings represents a box of a quadrangular form, constructed with open slat-work on its sides, as shown, for the purpose of securing proper ventilation. It has a post at each corner, (marked *c*,) cut out on its inner side so as to be adapted for holding the square corners of the trays or frames, hereinafter mentioned, and allow them to be packed closely one upon another.

The letter *e* represents a cushion attached to the lower side of the lid of the box, arranged to protect the eggs in the upper frame or tray, and to serve as an aid in removing the eggs.

The letters *a* represent cloth pockets, arranged in the respective compartments, formed by the web of cords in the frame or tray. Each of these pockets is designed to hold one egg.

My web of cords is shown on Fig. 3.

I do not desire to confine myself to any particular material in the construction of this web; nor do I wish to confine my claim to invention to any particular shape or material for pockets, my main object being to suspend single eggs in trays in such manner that collision between them will be impossible, and thereby transportation be made safe.

What I claim as my invention, and desire to secure by Letters Patent, is—

1. An egg-carrier constructed with compartments in removable trays or shelves, in which eggs may be suspended by cords or their equivalents.

2. In an egg-carrier provided with pockets or compartments in removable trays for shelves, for the reception of single eggs, the use of suspending-cords in the construction of such pockets or compartments.

3. A suspension egg-carrier composed of cloth pouches for holding single eggs suspended between meshes of cords or twine laced through the sides of the wooden trays set in a wooden holder, constructed and arranged as set forth by the drawings.

In testimony that I claim the above I have hereunto subscribed my name in the presence of two witnesses.

ABNER H. BRYANT.

Witnesses:

W. S. BRADLEY,

CHAS. HUBBARD.